United States Patent
Kohri (10) Patent No.: US 7,061,653 B2
(45) Date of Patent: Jun. 13, 2006

(54) IMAGE PROCESSING APPARATUS AND METHOD

(75) Inventor: Shinichiro Kohri, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1020 days.

(21) Appl. No.: 09/790,600

(22) Filed: Feb. 23, 2001

(65) Prior Publication Data

US 2001/0024301 A1    Sep. 27, 2001

(30) Foreign Application Priority Data

Feb. 25, 2000    (JP) ............................. 2000-049264

(51) Int. Cl.
*H04N 1/00*    (2006.01)
(52) U.S. Cl. ...................... 358/400; 358/401; 358/1.15
(58) Field of Classification Search ................ 358/400, 358/401, 405, 411, 518, 524, 527, 530, 2.15
See application file for complete search history.

(56) References Cited

U.S. PATENT DOCUMENTS

| 5,485,283 A | * | 1/1996 | Kaneko | ...................... 358/518 |
| 5,786,906 A | * | 7/1998 | Shishizuka | .................. 358/500 |
| 5,896,207 A | * | 4/1999 | Tomida | ...................... 358/537 |
| 5,956,162 A | * | 9/1999 | Nobuta | ....................... 358/500 |
| 6,008,913 A | * | 12/1999 | Yoshida | ...................... 358/529 |
| 6,426,809 B1 | * | 7/2002 | Hayashi et al. | ............. 358/529 |
| 6,522,424 B1 | * | 2/2003 | Nakahara et al. | ........... 358/1.17 |
| 6,809,836 B1 | * | 10/2004 | Nobuta et al. | ............... 358/1.9 |

* cited by examiner

*Primary Examiner*—Mark Wallerson
*Assistant Examiner*—Negussie Worku
(74) *Attorney, Agent, or Firm*—Fitzpatrick, Cella, Harper & Scinto (57) ABSTRACT

An image processing apparatus for transmitting plural images including an image of cover page, an image held by application software, and an image of original to be read, by facsimile transmission respectively in a mode desired by a user (monochrome, color/gray scale or the like). In a dialog for detailed setup of facsimile transmission, a Cover Page field 47 has a pop-up menu for selecting color or monochrome transmission to send the cover page, an Application field 48 has a pop-up menu for selecting color or monochrome mode to transmit the image held by the application software, and a Document field 49 has a pop-up menu for selecting color or monochrome transmission to transmit the image of the original set on a scanner.

9 Claims, 6 Drawing Sheets

IMAGE PROCESSING APPARATUS AND METHOD

FIELD OF THE INVENTION

The present invention relates to an image processing apparatus and method, and more particularly, to an image processing apparatus and method for transmitting a color image by facsimile transmission by an image communication apparatus connected to the image processing apparatus.

BACKGROUND OF THE INVENTION

Image forming apparatuses such as color copiers and color printers are widely used, and color facsimile apparatuses are developed as image communication apparatuses.

Communication methods of the color facsimile apparatuses are standardized as the ITU-T Recommendations T.30, T.4, T.42 and T.81. For color image coding, the JPEG (Joint Photographic Experts Group) method in the Recommendation T.81 is adopted.

In the color facsimile apparatus standardized in the Recommendation T.30, as the necessary minimum color image data format, a main scanning width of A4 and a resolution of 200 dpi are defined; and as an option format, one of main scanning widths of B4 and A3, and one of resolutions of 100 dpi, 300 dpi and 400 dpi can be selected.

As color image printing methods, a sublimation thermal-transfer method, a thermal-wax method, an electrophotographic method, an ink-jet method and the like are known. Color reproducibility differs in accordance with printing method, and further, the color reproducibility differs in accordance with type of print sheet, or type or composition of ink.

On the other hand, an apparatus which does not have a color facsimile function as a single apparatus, but has the color facsimile function when connected to a device such as a personal computer (PC) where facsimile application software (hereinbelow referred to as "FAX software") runs, has been developed. Even application software which supports only monochrome data can transmit a color image by this apparatus.

In a case where the above apparatus and the application software that supports only monochrome data are used for facsimile transmission, if a cover page is in color, a color image is transmitted. In this transmission, encoding time is longer and decoding time on the receiving side is longer in comparison with monochrome image transmission. Accordingly, users must bear waiting time longer than necessary. Further, in case of color image transmission, as the amount of data increases in comparison with monochrome image transmission, communication time increases and communication cost increases. Further, as the color image encoding is performed by using the JPEG method, a received image is degraded due to lossy data compression.

Even though the application software supports a color image, when there is a monochrome image and it is transmitted as a color image, a problem similar to the above problem occurs. Further, if a monochrome original image exists on the facsimile apparatus capable of color image transmission, a problem similar to the above problem occurs.

In other words, it is impossible to transmit an image of cover page, an image held by application software, and original image to be read, respectively in a mode desired by a user (monochrome, color and/or gray scale or the like) in one transmission process.

SUMMARY OF THE INVENTION

The present invention has been proposed to solve the conventional problems, and has its object to provide an image processing apparatus and method for transmitting plural images to be transmitted in one transmission process in modes respectively corresponding to the types of the images.

According to the present invention, the foregoing object is attained by providing an image processing apparatus of a facsimile, the apparatus comprising: an inputter, arranged to enable a user to input types of data to be transmitted in correspondence with respective types of plural images to be transmitted in one transmission process; and a generator, arranged to generate transmission data of the images to be transmitted, based on setup of the inputter.

Further, another object of the present invention is to provide an image processing apparatus and method for transmitting an image to be transmitted in a mode corresponding to the type of the image.

According to the present invention, the foregoing object is attained by providing the image processing apparatus having the above construction, further comprising a switch, arranged to enable the user to set whether or not the setup of the inputter is cancelled.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings. An image communication apparatus described below is a facsimile apparatus having G3 facsimile functions, which is used when connected to an analog telephone line. A color image transmission/reception function is added to the facsimile apparatus.

[Construction of Image Communication Apparatus]

Figure 1:
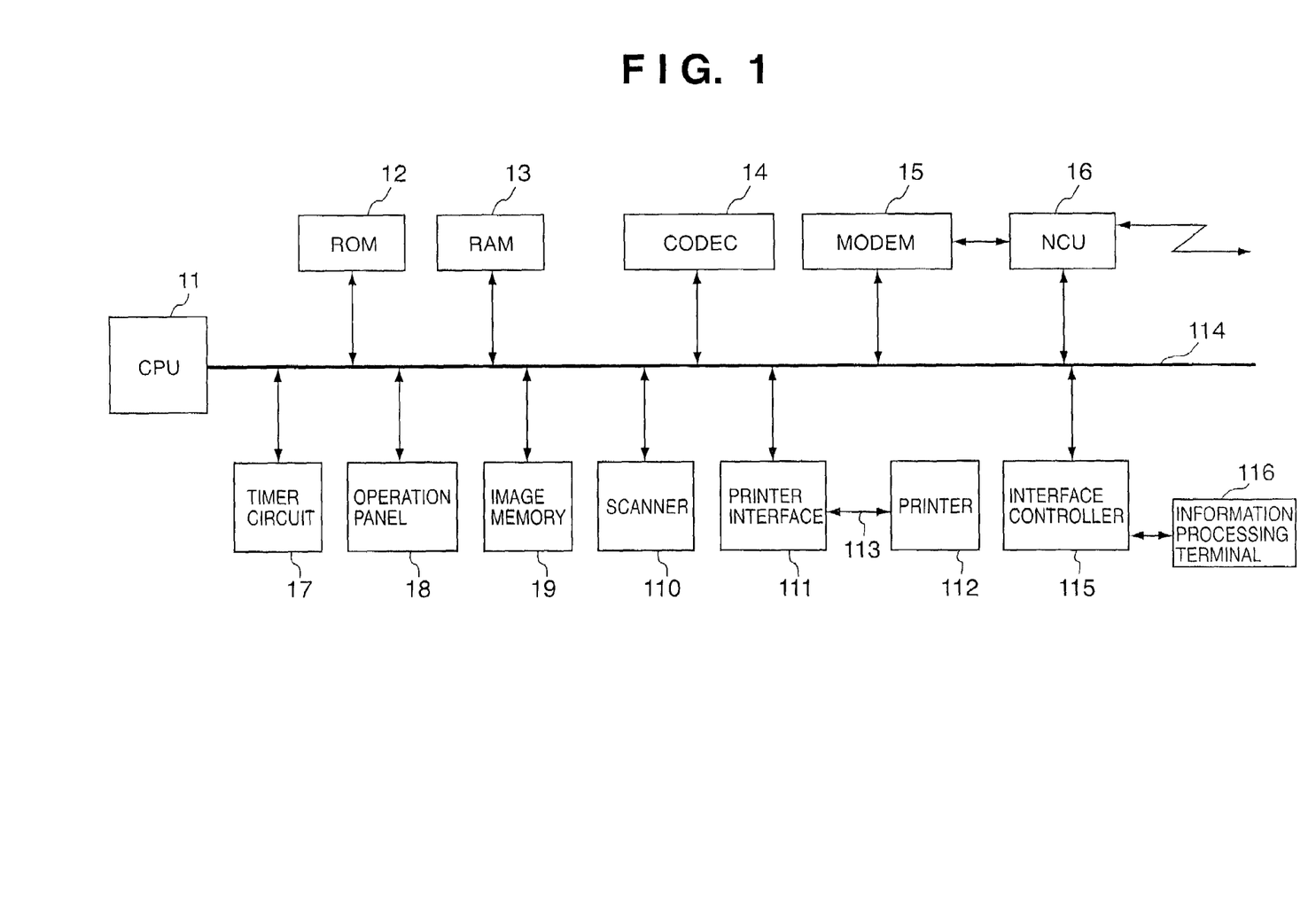
FIG. 1 is a block diagram showing the construction of an image communication apparatus according to an embodiment of the present invention.

FIG. 1 is a block diagram showing the construction of the image communication apparatus according to the embodiment of the present invention.

In FIG. 1, a CPU 11 controls the overall apparatus via a system bus 114. A program for various controls by the CPU 11 is stored in a ROM 12. Further, RAM 13 is used as a work area for the CPU 11. The RAM 13 is a nonvolatile memory backed up by a battery.

A CODEC 14 performs functions of color space conversion, raster→block conversion and JPEG encoding upon color image transmission, performs functions of JPEG decoding, color space reverse conversion and block→raster conversion upon color image reception, and performs MR (Modified READ) coding or decoding upon monochrome image transmission/reception. That is, the CODEC 14 converts input RGB color component signals (for example, respective 8 bits per pixel) into L*a*b* uniform color space signals, and performs JPEG base-line coding on the signals and output them. On the other hand, when JPEG base-line coded signals are inputted, the CODEC 14 converts L*a*b* uniform color space signals obtained by decoding the input signals into CMYK color component signals and output them.

A MODEM 15 in conformity with the ITU-T Recommendations V.8/V.34/V.17/V.29/V.27ter performs modulation/demodulation on a transmission/reception signal. An NCU (Network Control Unit) 16 controls connection with a telephone network and the like, and a timer circuit 17 comprises a timer LSI or the like having a calendar function.

An operation panel 18 has various operation keys and an LCD display unit. An image memory 19 of a semiconductor memory is controlled for storing image data in page units.

A color scanner 110 optically reads an original image, color-separates the read data into RGB components, and outputs respectively 8-bit multivalue color data as data of respective pixels. Note that in the present embodiment, the color scanner 110 uses a color contact sensor as a reading device, and has an ADF (Automatic Document Feed) mechanism for automatically feeding an original to be read.

A printer interface 111, having a quantization processor and an interface controller, connects a printer 112 to the apparatus via a Centronics-compatible general interface 113 and controls the printer 112. When CMYK multivalue signals are inputted, the printer interface 111 quantizes the respective color multivalue signals into binary signals, ternary signals or the like and transmits the signals to the printer 112, and at the same time, detects the status of the printer 112 via the interface and informs the CPU 11 of the printer status.

The printer 112 prints a color image in accordance with an ink-jet printing method. Ink cartridges attachable to the printer 112 include a cartridge for monochrome printing, a cartridge for color printing and a cartridge for high definition color printing. The type of attached cartridge is discriminated by the printer interface 111.

An interface controller 115 controls interface with an information processing terminal 116 such as an external personal computer or a word processor. As the interface, a serial interface such as an RS232C interface, an IEEE1394 interface or a USB interface, or a parallel interface such as a Centronics interface or a GPIB interface, or LAN interface such as an Ethernet interface can be used.

Remote operations from the information processing terminal 116 for transmission, printing, data registration and the like, are performed by inputting predetermined commands, parameters, data and the like into the image communication apparatus via the interface controller 115. Note that a remote operation application and/or driver software is installed in the information processing terminal 116.

[Construction of Information Processing Terminal]

Figure 2:
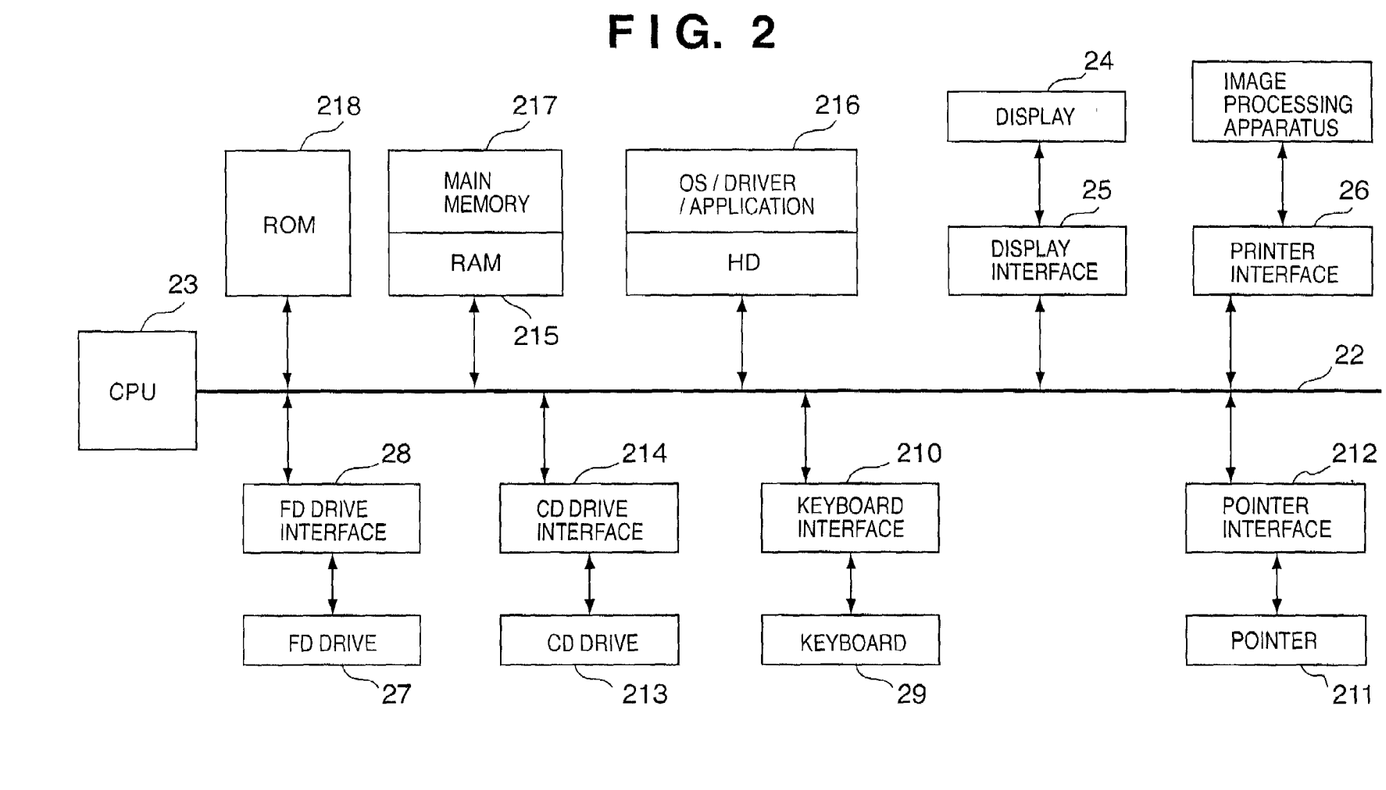
FIG. 2 is a block diagram showing the construction of an information processing terminal in FIG. 1.

FIG. 2 is a block diagram showing the construction of the information processing terminal 116. In the present embodiment, a general personal computer is utilized as the information processing terminal 116.

As shown in FIG. 2, the information processing terminal 116 mainly comprises a central processing unit (CPU) 23 as a programmable microprocessor connected to a system bus 22. Interfaces connected to the system bus 22 include a display interface 25 for a display 24, a printer interface 26 for interface with the image communication apparatus in FIG. 1, an FD interface 28 for a floppy disk (FD) drive 27, a keyboard interface 210 for a keyboard 29, a pointing device interface 212 for a pointing device 211, and a CD interface 214 for a compact disk (CD) drive 213.

A main memory 217 comprising a random access memory (RAM) 215 or the like is connected to the system bus 22 for access to a memory area from the CPU 23. Especially, upon execution of command sequence related to an application program stored in a hard disk (HD) 216, the CPU 23 loads the command sequence to the main memory 217 via the HD 216 (or another storage medium accessible via a network, the FD drive 24 or CD drive 214) and executes the command sequence.

As described in detail later, the main memory 217 has a printer data buffer used by the printer driver of the present embodiment. Note that data may be swapped in segment units between the main memory 217 and the HD 216 by a standard disk swapping technique available on an operating system such as Windows (trademark of Microsoft Corporation).

A read only memory (ROM) 218 is used for storing a start-up command sequence and an invariant command sequence such as a basic input-output operating system (BIOS) for operating the keyboard 29.

As described above, the HD 216 is used for storing the program command sequence of Windows operating system and program command sequences of various application programs such as graphics, drawing and desktop publishing programs. Further, the HD 216 is used for storing a color image file displayed on the monitor/display 24 under the control of designated application program or printed.

Further, the HD 216 is used for storing the following drivers. A color monitor driver controls how to supply multivalue RGB primary-color values to the display interface 25. A printer driver obtains CMYK color component values from the RGB primary-color values and processes the CMYK color component values for printing and supplies the CMYK color component values to the printer interface 26. A FAX driver converts an image into data of facsimile transmission format, and enables input of transmission destination, resolution and the like and operates in close connection with an application. The FAX driver includes a scanner driver, and a scanner driver to forward an image read by the scanner 110 of the image communication apparatus in FIG. 1 to an image processing application. Note that a driver to supply appropriate signals to various devices such as a network device connected to the information processing terminal 116 is also stored in the HD 216.

In normal times, the application and driver programs stored in the HD 216 are installed into the HD 216 by a user of the information processing terminal 116 or the like from other storage media. In ordinary cases, the user obtains the other storage medium such as a floppy disk and CD-ROM holding duplications of the application programs including the above drivers, and installs the application programs into the HD 216 by a well-known technique. At the same time or in other cases, the user can obtain the application programs including the above drivers by downloading them from file servers or computerized bulletin boards via a MODEM (not shown) or the network (not shown).

[User Interface]

Figure 3:
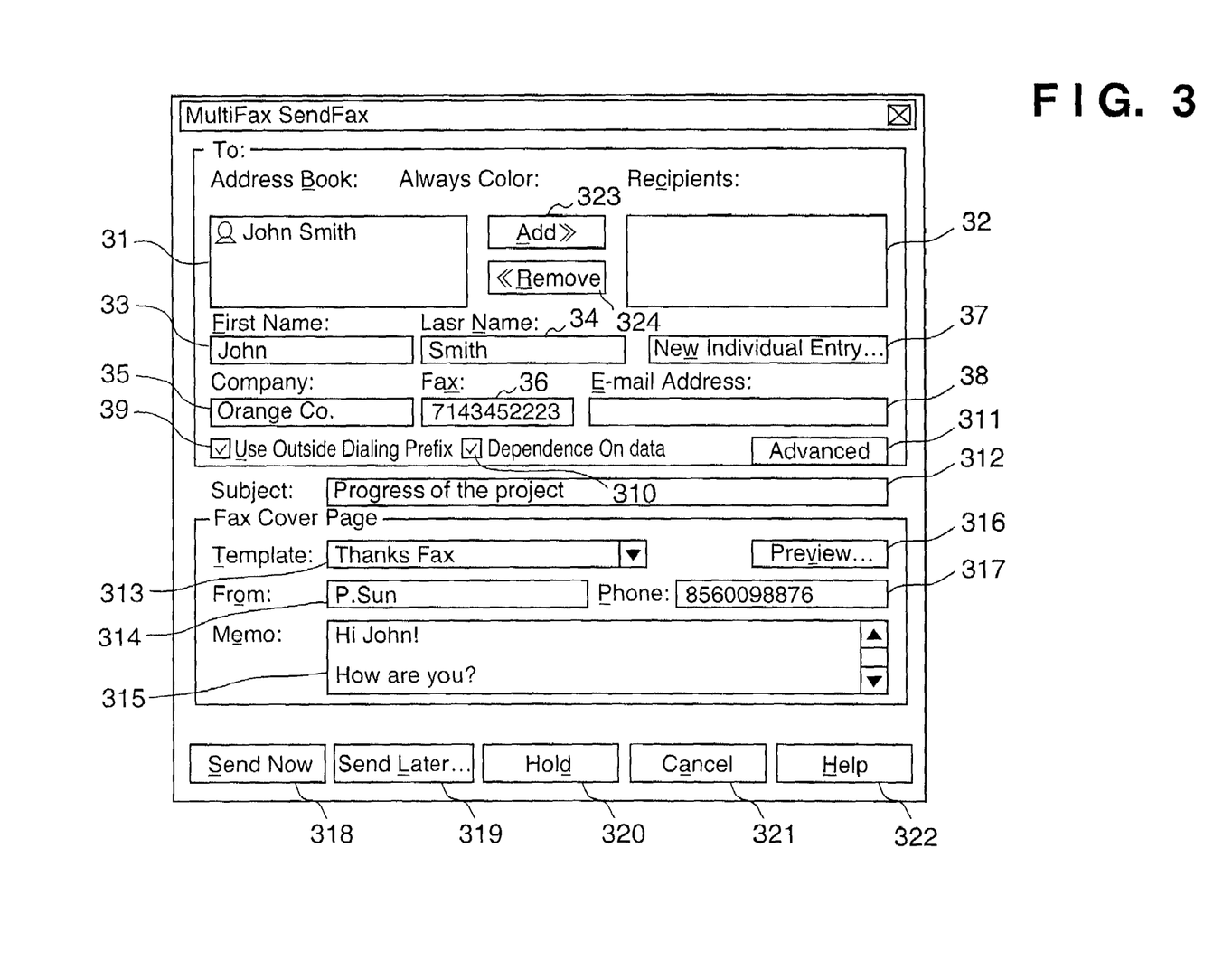
FIG. 3 is a diagram showing a dialog for determining a destination and a transmission method for facsimile transmission.

FIG. 3 shows a dialog for determining a destination and a transmission method for facsimile transmission. The dialog in FIG. 3 is displayed by designating the FAX driver in a display image for selecting a printer driver from an application capable of image-editing such as word processor or spread sheet software, and designating execution of the driver. As the driver selection method is already well known, the details of the method will not be explained.

When "John Smith" in an Address Book field 31 is selected by the pointing device 211, the registered content is displayed. In FIG. 3, a name "John" is displayed in a First Name field 33, a family name "Smith" is displayed in a Last Name field 34, a company name "Orange Co." is displayed in a Company field 35, and a facsimile number "7143452223" is displayed in a Fax field 36. An E-mail field 38 displays no E-mail address, which means no E-mail address is registered. The items from the First Name field 33 to the E-mail field 38 may be directly inputted.

In normal times, a name in the Address Book field 31 is selected and an Add button 323 is depressed, thereby the name is registered in an Addressee field 32 and determined as a facsimile transmission destination. Further, when a name in the Address Book field 31 is selected and a Remove button 324 is depressed, the name is removed from facsimile transmission destinations. In this embodiment, the facsimile transmission destination is designated, however, it may be arranged such that an E-mail address is registered and thereby an E-mail destination is designated in a similar procedure.

A Use Outside Dialing Prefix check box 39 is used for designating, in a case where the image communication apparatus of the present embodiment is connected to an extension, whether or not a pre-set outside call origination dialing is used. In FIG. 3, as the check box 39 is checked, an outside call origination dialing is used.

A Dependence on data check box 310 is used for designating, in a case where data types set in fields 47 to 49 indicative of data types of cover page, application data and an original, to be described later, are different from actual data types, whether transmission is to be made respectively in a mode in accordance with the actual data type or in a mode in accordance with setting of switch indicative of data type. In FIG. 3, transmission is to be made respectively in a mode in accordance with actual data type.

Further, it may be arranged such that in use of warning mode, the Dependence on data check box 310 is not displayed on the dialog, but a warning image is displayed to ask the user whether or not the setup is to be changed.

Further, the fields indicative of data types are not limited to the Cover Page, Application (image held by application software), Document (original image to be read), however, fields for setting data types may be provided in correspondence with types of images to be transmitted, in accordance with necessity.

Figure 4:
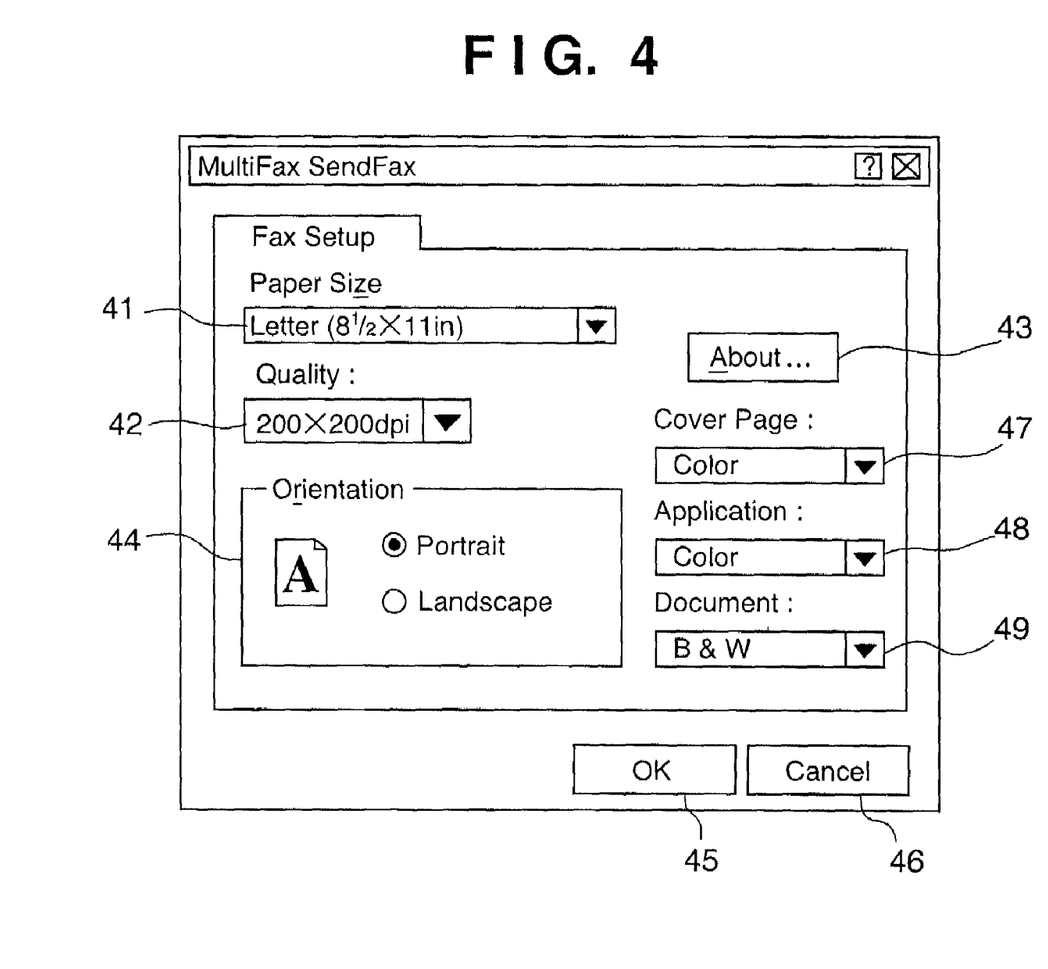
FIG. 4 is a diagram showing a dialog displayed by depression of Advanced button in FIG. 3, for detailed setup of the facsimile transmission.

An Advanced button 311 is used for displaying a dialog as shown in FIG. 4 to be described later. In the dialog, an image size, a resolution, an orientation and the like are selected. A Subject field 312 is used for input of subject to be written on the cover page to be described below. In FIG. 3, "Progress of the project" is inputted in this field.

Next, the arrangement of Fax Cover Page displayed under the Subject field 312 will be described. A Template field 313 has a pop-up menu for selecting the type of cover page added as a head page of facsimile transmission. In FIG. 3, a template "Thanks Fax" is selected. An addresser "P. Sun" in a From field 314, a telephone number "8560098876" in a Phone field 317, and a message "Hi John! How are you? . . . " in a Memo field 315 are automatically inputted into predetermined positions of the cover page. Further, when a Preview button 316 is depressed, the cover page is displayed and the user can check whether or not proper contents have been set.

A Send Now button 318 is depressed when facsimile transmission is to be performed without any delay. A Send Later button 319 is depressed when facsimile transmission is to be performed later. If this button is depressed, a dialog requiring input of transmission timing is displayed. A Hold button 320 is depressed when facsimile transmission is suspended. A Cancel button 321 is depressed when the setup of the dialog in FIG. 3 is invalidated and the dialog is to be dismissed. A Help button 322 is depressed when the user wants to see help. If this button is depressed, a help image is displayed.

FIG. 4 shows the dialog displayed by depression of the Advanced button in FIG. 3, for detailed setup of the facsimile transmission.

A Paper Size field 41 has a pop-up menu for selecting the image size of transmission. As the image size, generally, one of A5, A4, A3, B5, B4, LTR, LGL and the like can be selected. A Quality field 42 has a pop-up menu for selecting the resolution of facsimile transmission. In case of monochrome transmission, one of 100×100 dpi, 200×200 dpi, 200×400 dpi, 300×300 dpi, and 400×400 dpi can be selected, and in case of color transmission, one of 100×200 dpi, 200×200 dpi, 300×300 dpi, and 400×400 dpi can be selected. An Orientation field 44 is used for selecting the orientation of transmission image. One of Portrait and Landscape can be selected by radio buttons.

Although not described here, the resolutions and color/monochrome transmission types can be combined as selection items Mono 100×200 dpi, Mono 200×200 dpi, Mono 200×400 dpi, Mono 300×300 dpi and Mono 400×400 dpi, and color 100×100 dpi, Color 200×200 dpi, Color 300×300 dpi and Color 400×400 dpi.

When an About button 43 is depressed, a dialog indicating information on the facsimile transmission dialog is displayed. When an OK button 45 is depressed, the setup of the dialog in FIG. 4 is validated and the display of the dialog is terminated.

When a Cancel button 46 is depressed, the setup of the dialog in FIG. 4 is invalidated and the display of the dialog is terminated.

The Cover Page field 47 has a pop-up menu for selecting color transmission or monochrome (BW) transmission to transmit the cover page. Similarly, the Application field 48 has a pop-up menu for selecting color mode or monochrome mode to transmit data held by the application software (application data), and the Document field 49 has a pop-up menu for selecting color transmission or monochrome transmission to transmit an image of the original set on the scanner 110.

Although not described here, the setups of the Quality field 42, the Cover Page field 47, the Application field 48 and the Document field 49 may be combined for transmission with different resolutions and transmission modes (color/monochrome) in one transmission process. Further, gray scale and the like may be added to the color and monochrome transmission modes.

[Processing]

Figure 5:
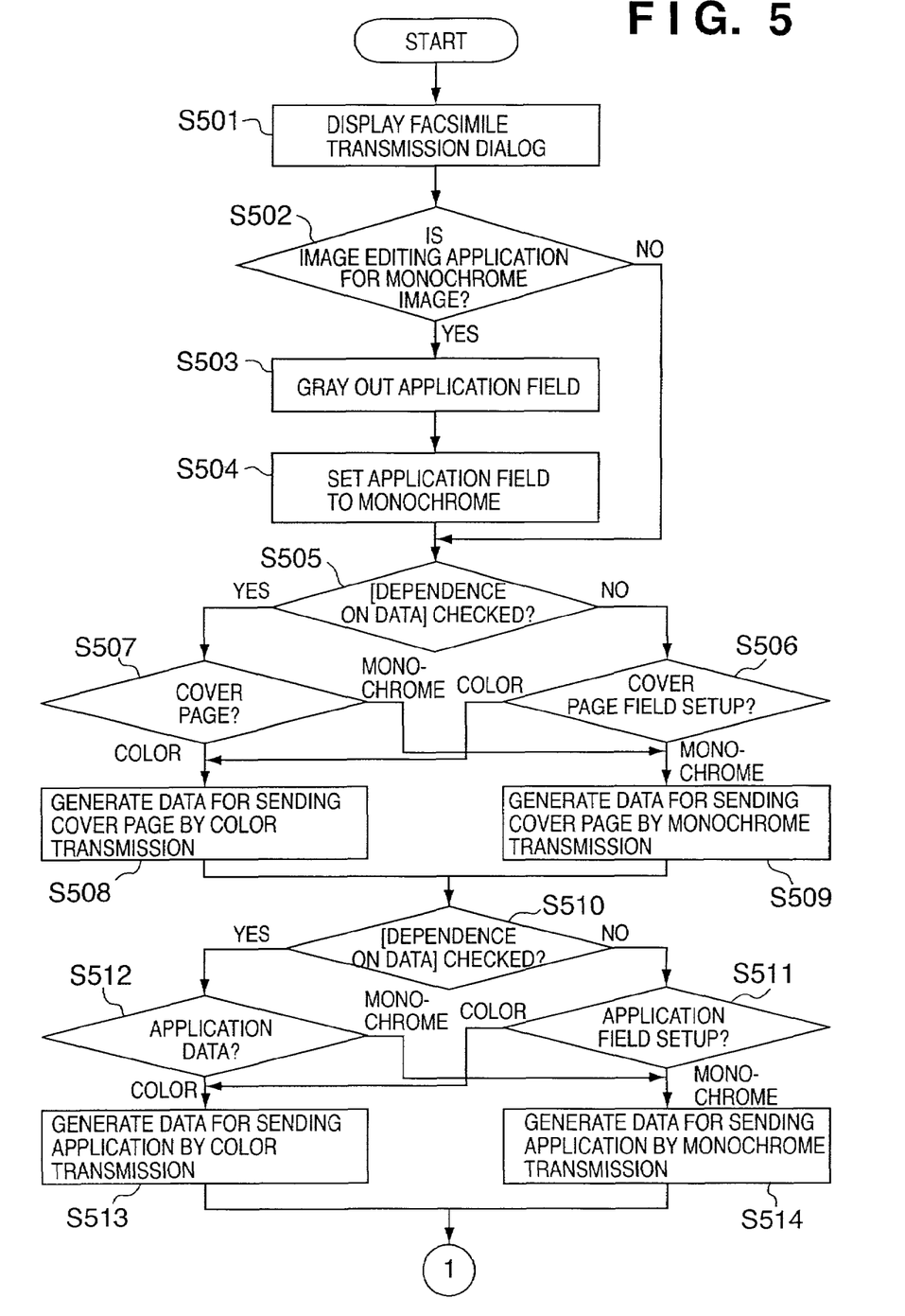
FIGS. 5 and 6 are flowcharts showing processing performed prior to facsimile transmission in a case where a FAX driver is selected from an image editing application and facsimile transmission is required.
Figure 6:
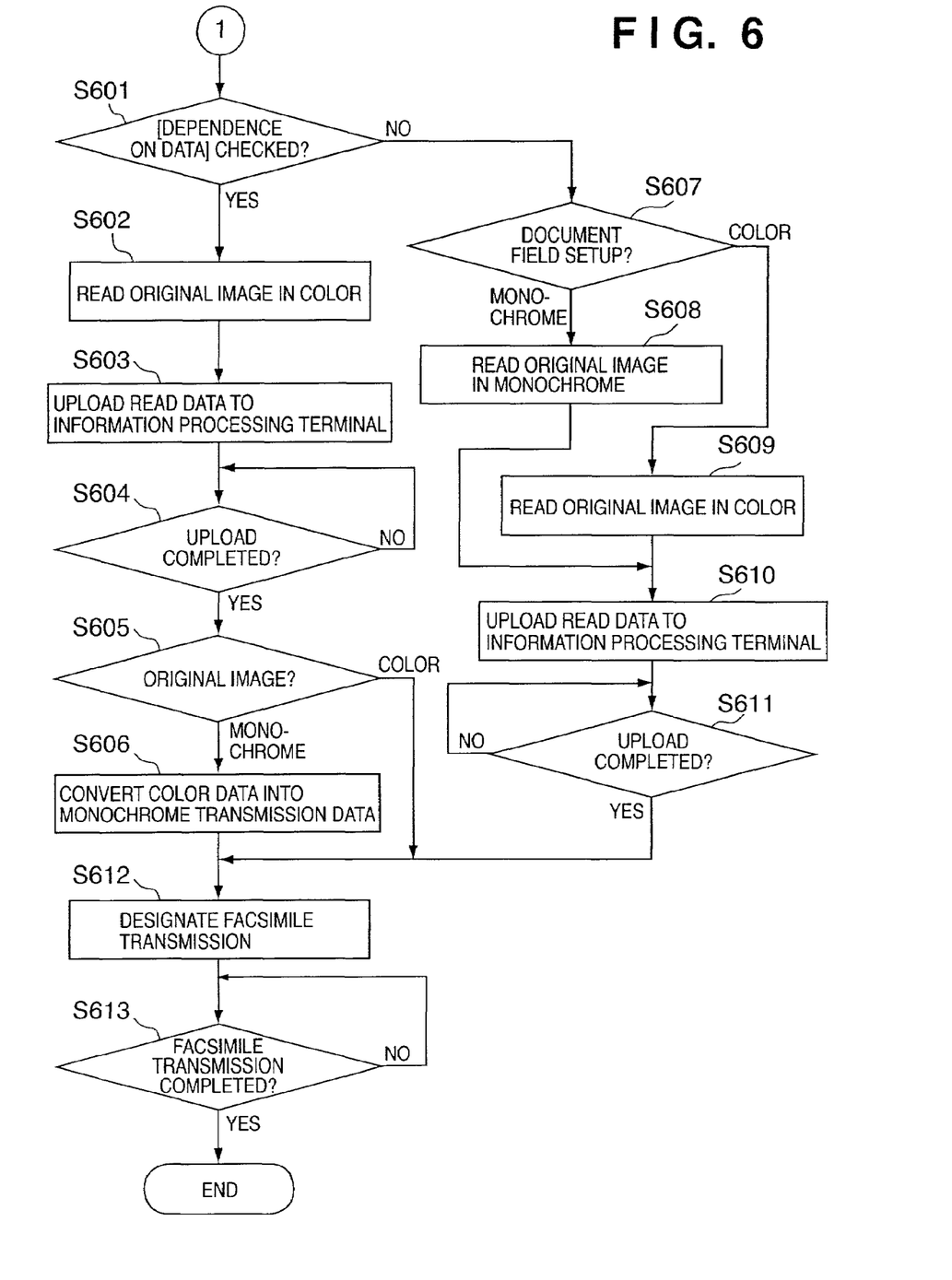

FIGS. 5 and 6 are flowcharts showing processing performed prior to facsimile transmission in a case where the FAX driver is selected from an image editing application and facsimile transmission is required.

If the FAX driver is selected from the image editing application so as to designate facsimile transmission, the facsimile transmission dialog in FIG. 3 is displayed on the display 24 at step S501. At step S502, the FAX driver inquires of the image editing application via the OS whether the application supports monochrome transmission or color transmission. If the image editing application supports only monochrome transmission, the process proceeds to step S503, at which the Application field 48 is grayed out to indicate that the field is invalid such that the user cannot change the setup of the Application field 48. Thereafter, at step S504, the Application field 48 is set to "B&W", i.e., monochrome transmission, then the process proceeds to step S505.

Further, if the image editing application supports color transmission, the Application field 48 is valid, and the process proceeds to step S505.

Note that at step S503, a warning message may be displayed in place of gray out of the Application field 48, for the user's selection of monochrome/color transmission.

Next, at step S505, it is determined whether or not the Dependence on data check box 310 is checked. If the check box 310 is not checked, the process branches to step S506, at which the setup of the Cover Page field 47 is examined. Further, if the Dependence on data check box 310 is checked, the process branches to step S507, at which it is determined whether or not the cover page is a color image. Then, based on the results of determination at steps S505 to S507, the process branches as shown in the following Table 1.

TABLE 1

| Dependence on data (S505) | Cover Page field (S506) | Cover Page (S507) | Process branches to: |
|---|---|---|---|
| Not checked | Color | — | S508 |
| Not checked | Monochrome | — | S509 |
| Checked | — | Color | S508 |
| Checked | — | Monochrome | S509 |

At step S508, data for sending the cover page by color transmission is generated, and at step S509, data for sending the cover page by monochrome transmission is generated. Then the process proceeds to step S510.

Next, at step S510, it is again determined whether or not the Dependence on data check box 310 is checked. If the check box 310 is not checked, the process branches to step S511, at which the setup of the Application field 48 is examined. If the Dependence on data check box 310 is not checked, the process branches to step S512, at which it is determined whether or not the application data is color data. Then, based on the results of determination at steps S510 to S512, the process branches as shown in the following Table 2.

TABLE 2

| Dependence on data (S510) | Application field (S511) | Application data (S512) | Process branches to: |
|---|---|---|---|
| Not checked | Color | — | S513 |
| Not checked | Monochrome | — | S514 |
| Checked | — | Color | S513 |
| Checked | — | Monochrome | S514 |

At step S513, data for sending the application data by color transmission is generated, and at step S514, data for sending the application data by monochrome transmission is generated. Then the process proceeds to step S601 in FIG. 6.

At step S601, it is again determined whether or not the Dependence on data check box 310 is checked. If the check box 310 is checked, the process branches to step S602, at which the image of the original set on the scanner 110 is read in color. At this time, the read color data of the original image is converted by the CODEC 14 into the L*a*b* color space in conformity with the ITU-T Recommendations, then JPEG-compressed, and stored into the image memory 19.

Next, at step S603, the image communication apparatus is instructed to upload the read data of the original image to the information processing terminal 116, and at step S604, the data upload is monitored. When the upload is completed, the process proceeds to step S605. Note that in the above description, all the pages of the original have been read and the read data is uploaded, however, it may be arranged such that the read data is uploaded while the respective pages of the original are read.

Next, at step S605, it is determined whether or not the read data of the original image is monochrome image data. If it is monochrome data, to perform monochrome transmission at step S606, the uploaded JPEG data is rasterized, then compressed by a facsimile-communication coding method such as the MH (Modified Huffman), the MR (Modified READ), the MMR (Modified Modified READ) or the like, then stored into the main memory 217 or the like, and the process proceeds to step S612. If the read data of the original image is color data, the process proceeds to step S612 without data conversion.

On the other hand, in the determination at step S601, if the Dependence on data check box 310 is not checked, the process branches to step S607, at which the Document field 49 is examined. If the Document field 49 is set to color, the process branches to step S609, at which the original image set on the scanner 110 is read in color, and the process proceeds to step S610. If the Document field 49 is set to monochrome, the process branches to step S608, at which the original image set on the scanner 110 is read in monochrome, and the process proceeds to step S610. Note that the processing at step S608 or S609 includes processing to convert the read data to data for facsimile transmission and store the data into the image memory 19.

Next, at step S610, the image communication apparatus is instructed to upload the read data of the original image to the information processing terminal 116. At step S611, the data upload is monitored, and when the upload is completed, the process proceeds to step S612. Note that in the above description, all the pages of the original have been read and the read data is uploaded, however, it may be arranged such that the read data is uploaded while the respective pages of the original are read.

Next, at step S612, a facsimile transmission command, including parameters necessary for transmission such as a telephone number of the destination of facsimile transmission and a name of the destination and image data to be transmitted, is issued to the image communication apparatus. The image communication apparatus receives the command, sets the telephone number, name of the destination and the like in accordance with the received parameters, and performs facsimile transmission while switching the transmission between monochrome transmission and color transmission in page units, in accordance with a procedure in conformity with the ITU-T Recommendations. At step S613, the facsimile transmission is monitored, and when the facsimile transmission is completed, the series of processing ends.

As described above, according to the present embodiment, transmission of image data held by the application software running on the information processing terminal 116 to be sent in facsimile transmission (application data), a cover page transmitted prior to the image data, and data of original image set on the scanner of the image communication apparatus can be respectively set to monochrome, color or gray scale transmission. Further, even if data types (monochrome or color) different from types of actual application data, cover page and original image are set, monochrome or color transmission can be performed in correspondence with the types of the actual application data, cover page and original image by setting the Dependence on data setup.

Thus, according to the present embodiment, a problem of transmitting a monochrome image in color transmission and the like can be prevented. Further, encoding and decoding time can be reduced, image degradation can be prevented, and communication cost can be suppressed.

Further, it may be arranged such that in a case where data types different from types of actual application data, cover page and original image are set, warning is issued so as to perform facsimile transmission more appropriate to data types or data types desired by the user.

[Other Embodiment]

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiment, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiment are realized by executing the program code which is read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

Further, the present invention is applicable to a case where a software program is delivered to users requested the program via a communication line for personal-computer communication or the like, from a storage medium where program code of the software program to realize the functions of the above-described embodiment are stored.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus capable of transmitting images corresponding to plural pages by facsimile communication, said apparatus comprising:
   a communication mode setting unit, arranged to set a communication mode based on a user instruction, wherein when plural types of data representing images are included in respective pages to be transmitted, the communication mode includes an indication for each pages, as to whether that page is to be respectively transmitted as a color or monochrome image; respectively, included in the
   a generating unit, arranged to generate a color or monochrome image in each of the plural pages to be transmitted, in accordance with the communication mode; and
   a transmitting unit, arranged to transmit the images corresponding to the plural pages generated by the generating unit.

2. The apparatus according to claim 1, further comprising a canceling unit, arranged to cancel the communication mode set by the communication mode setting unit, based on a user instruction, wherein the generating unit generates a color or monochrome image in each of the plural pages to be transmitted, in accordance with a predetermined setting when the communication mode is cancelled.

3. The apparatus according to claim 1, further comprising a reading unit, arranged to read an image of an original, wherein the plural types of data are image data held by application software, image data of transmission cover page and image data read by the reading unit.

4. A method of an image processing apparatus capable of transmitting images corresponding to plural pages by facsimile communication, the method comprising the steps of:
   setting a communication mode based on a user instruction, wherein when plural types of data representing images are included in plural pages to be transmitted, the communication mode indicates an image represented by each type of the data to be transmitted as a color or monochrome image;
   generating a color or monochrome image in each of the plural pages to be transmitted, in accordance with the communication mode; and
   transmitting the images corresponding to the plural pages generated in the generating step.

5. The method according to claim 4, further comprising the step of canceling the communication mode in the setting step, based on a user instruction, wherein the generating step includes generating a color or monochrome image in each of the plural pages to be transmitted, in accordance with a predetermined setting when the communication mode is cancelled.

6. The method according to claim 4, further comprising the step of reading an image of an original by using a reader, wherein the plural types of data are image data held by application software, image data of transmission cover page and image data read by the reader.

7. A computer program product stored on a computer readable medium comprising computer program code, for a method of an image processing apparatus capable of transmitting images corresponding to plural pages by facsimile communication, the method comprising the steps of:

setting a communication mode based on a user instruction, wherein when plural types of data representing images are included in plural pages to be transmitted, the communication mode indicates an image represented by each type of the data to be transmitted as a color or monochrome image;

generating a color or monochrome image in each of the plural pages to be transmitted, in accordance with the communication mode; and transmitting the images corresponding to the plural pages generated in the generating step.

8. The product according to claim 7, wherein the method further comprises the step of canceling the communication mode in the setting step, based on a user instruction, wherein the generating step generates a color or monochrome image in each of the plural pages to be transmitted, in accordance with a predetermined setting when the communication mode is cancelled.

9. The product according to claim 7, wherein the method further comprises the step of reading an image of an original by using a reader, wherein the plural types of data are image data held by application software, image data of transmission cover page and image data read by the reader.

* * * * *

UNITED STATES PATENT AND TRADEMARK OFFICE
CERTIFICATE OF CORRECTION

| | |
|---|---|
| PATENT NO. | : 7,061,653 B2 |
| APPLICATION NO. | : 09/790600 |
| DATED | : June 13, 2006 |
| INVENTOR(S) | : Shinichiro Kohri |

It is certified that error appears in the above-identified patent and that said Letters Patent is hereby corrected as shown below:

ON THE TITLE PAGE [75]:

Inventor, "Shinichiro Kohri, Chiba (JP)" should read --Shinichiro Kohri, New York (US)--.

COLUMN 2:

Line 4, "has" should read --has as--.

COLUMN 10:

Line 13, "users" should read --users that--;
    Line 32, "pages," should read --page,-- and delete "respectively";
    Line 33, delete "respect-";
    Line 34, delete "tively, included in the";
    Line 36, "image" should read --image, respectively,--; and
    Line 37, "the" should read --the indication for each page, respectively, included in the set--.

Signed and Sealed this

Twelfth Day of June, 2007

JON W. DUDAS
*Director of the United States Patent and Trademark Office*